United States Patent
Sato et al.

(10) Patent No.: US 10,509,400 B2
(45) Date of Patent: Dec. 17, 2019

(54) CONTROL SYSTEM FOR AND CONTROL METHOD OF AUTONOMOUS DRIVING VEHICLE

(71) Applicant: Toyota Jidosha Kabushiki Kaisha, Toyota-shi, Aichi-ken (JP)

(72) Inventors: Jun Sato, Susono (JP); Yuma Kawamori, Susono (JP); Keiko Tosaki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 218 days.

(21) Appl. No.: 15/686,836

(22) Filed: Aug. 25, 2017

(65) Prior Publication Data

US 2018/0059661 A1 Mar. 1, 2018

(30) Foreign Application Priority Data

Aug. 26, 2016 (JP) ................................ 2016-165860

(51) Int. Cl.
| | |
|---|---|
| *G05D 1/00* | (2006.01) |
| *B60W 50/08* | (2012.01) |
| *B60W 50/14* | (2012.01) |
| *B60W 30/182* | (2012.01) |
| *B60W 40/04* | (2006.01) |
| *B60W 50/16* | (2012.01) |

(52) U.S. Cl.
CPC ............ *G05D 1/0061* (2013.01); *B60W 40/04* (2013.01); *B60W 50/16* (2013.01); *G05D 1/0088* (2013.01); *B60W 2050/143* (2013.01); *B60W 2050/146* (2013.01); *B60W 2550/12* (2013.01); *B60W 2550/20* (2013.01)

(58) Field of Classification Search
None
See application file for complete search history.

(56) References Cited

U.S. PATENT DOCUMENTS

| | | | |
|---|---|---|---|
| 5,774,069 A | 6/1998 | Tanaka et al. | |
| 8,509,982 B2 | 8/2013 | Montemerlo et al. | |
| 8,670,891 B1 | 3/2014 | Szybalski et al. | |
| 8,718,861 B1 * | 5/2014 | Montemerlo | B60W 30/00 701/26 |
| 8,825,264 B2 | 9/2014 | Montemerlo et al. | |
| 9,365,213 B2 * | 6/2016 | Stenneth | B60W 30/00 |
| 9,594,373 B2 * | 3/2017 | Solyom | G05D 1/0212 |
| 9,628,565 B2 * | 4/2017 | Stenneth | B60Q 9/008 |

(Continued)

FOREIGN PATENT DOCUMENTS

| | | |
|---|---|---|
| JP | H09161196 A | 6/1997 |
| JP | 2001199295 A | 7/2001 |

(Continued)

*Primary Examiner* — Adam D Tissot
(74) *Attorney, Agent, or Firm* — Dinsmore & Shohl LLP

(57) ABSTRACT

A control system for an autonomous driving vehicle is provided with a notification device 10 for giving notification to a driver and an electronic control unit 20. Autonomous driving is performed and an autonomous driving reliability value expressing a degree of reliability of autonomous driving is calculated during autonomous driving. If the autonomous driving reliability value is equal to or smaller than a predetermined preparation request value, the notification device is controlled to notify a request for preparing for manual driving to the driver.

10 Claims, 7 Drawing Sheets

(56) References Cited

U.S. PATENT DOCUMENTS

| | | | |
|---|---|---|---|
| 10,331,127 B2 * | 6/2019 | Oba | B60W 50/08 |
| 2017/0303842 A1 | 10/2017 | Yoshida et al. | |
| 2017/0329328 A1 | 11/2017 | Horita et al. | |
| 2018/0088572 A1 * | 3/2018 | Uchida | B60W 50/14 |

FOREIGN PATENT DOCUMENTS

| | | | |
|---|---|---|---|
| JP | 4019865 B2 | 12/2007 | |
| JP | 2013544695 A | 12/2013 | |
| JP | 2015179037 A | 10/2015 | |
| JP | 2015230573 A | 12/2015 | |
| JP | 2016064773 A | 4/2016 | |
| JP | 2016130971 A | 7/2016 | |
| WO | 2012047743 A2 | 4/2012 | |

\* cited by examiner

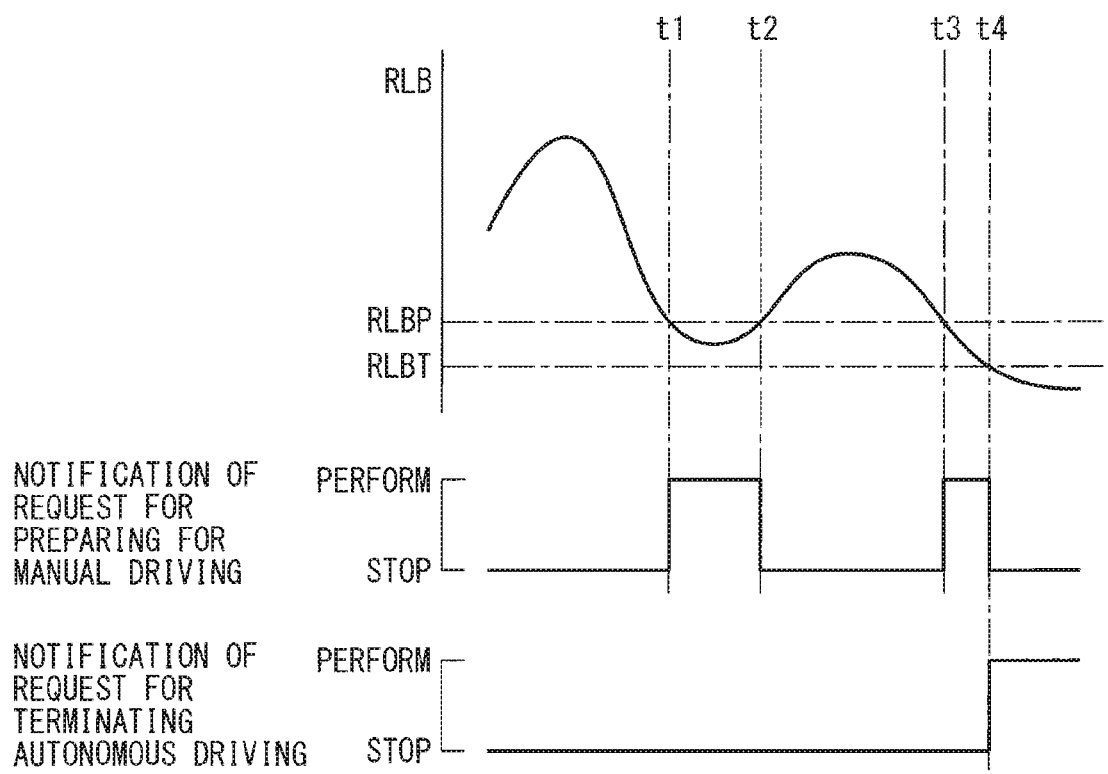

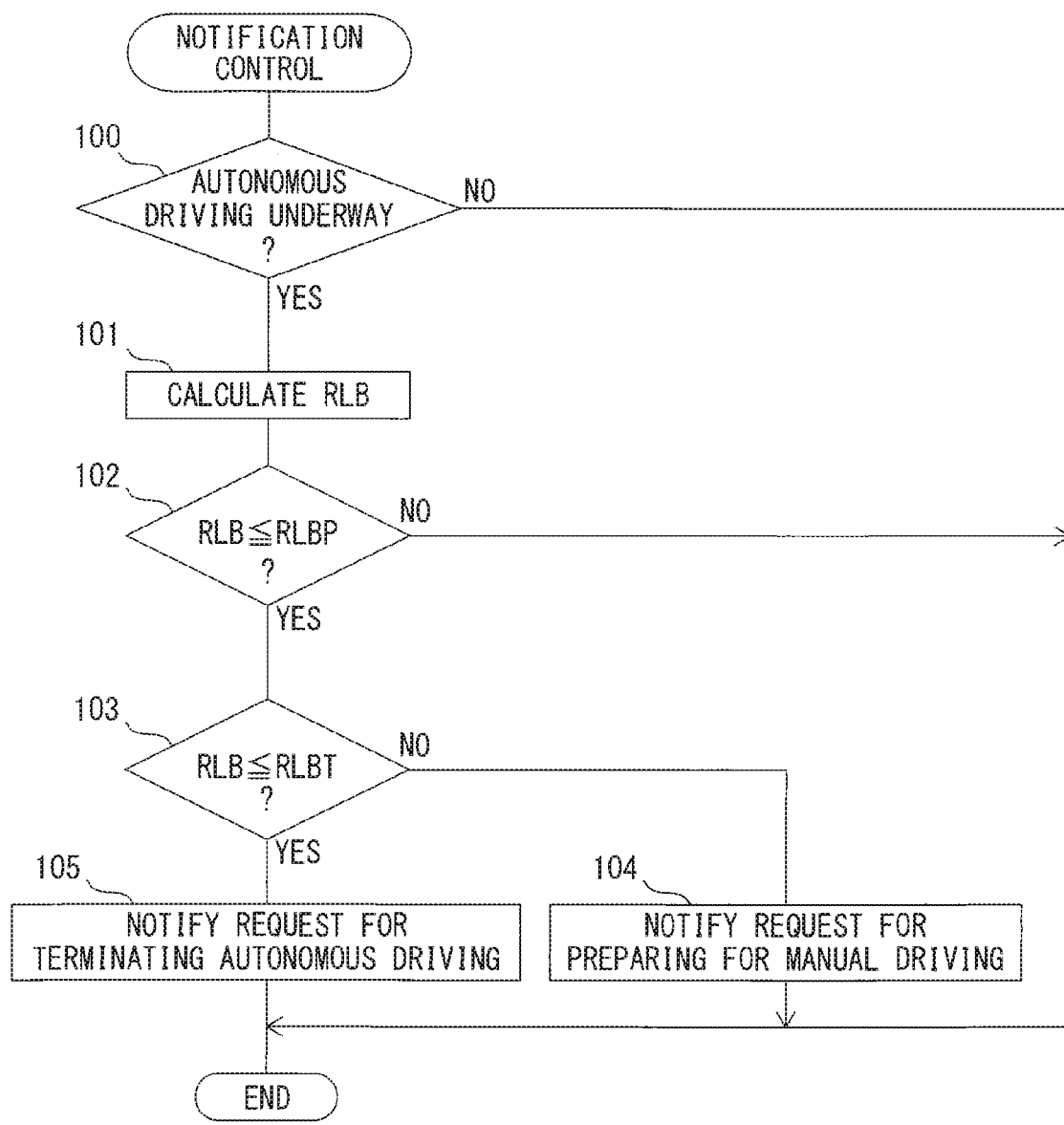

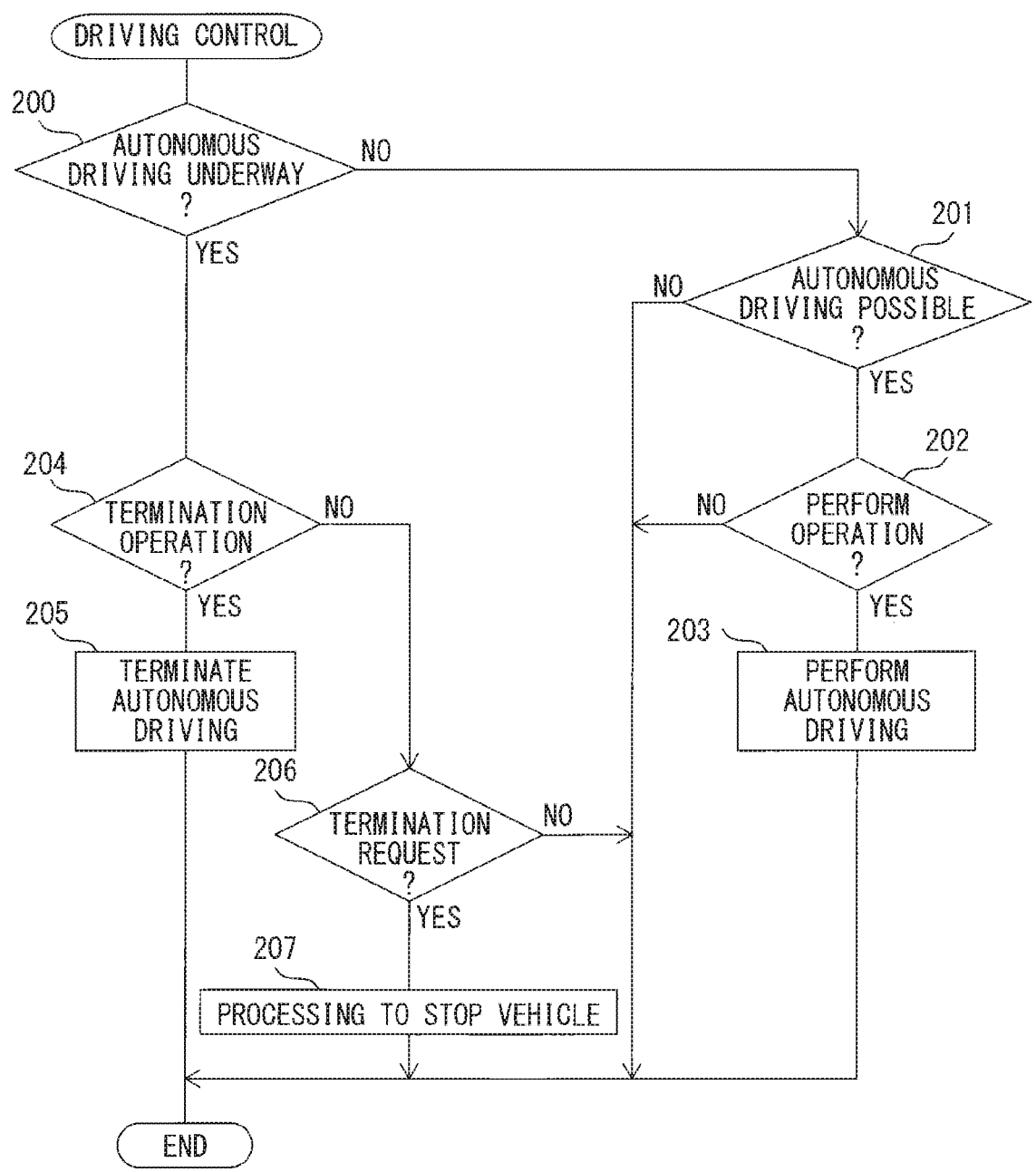

CONTROL SYSTEM FOR AND CONTROL METHOD OF AUTONOMOUS DRIVING VEHICLE

CROSS-REFERENCE TO RELATED APPLICATIONS

This application claims priority to Japanese Patent Application No. 2016-165860 filed Aug. 26, 2016, the entire disclosure of which is incorporated by reference herein.

BACKGROUND

1. Technical Field

The present disclosure relates to a control system for and control method of an autonomous driving vehicle.

2. Related Art

An autonomous driving vehicle is known in the art, which gives notification to a driver if the vehicle approaches an area where autonomous driving may be difficult (for example, see Japanese Patent Publication No. 2013-544695A). In one example, the vehicle requests control of steering, acceleration, deceleration, etc. to the driver. Note that, in Japanese Patent Publication No. 2013-544695A, positional information of that area is included in map information.

SUMMARY

In Japanese Patent Publication No. 2013-544695A mentioned above, positions of areas where autonomous driving may be difficult are stored in advance in the form of map information. Therefore, whether or not a situation where autonomous driving may be difficult is known in advance. In this regard, however, if, during autonomous driving, for example, the number of other vehicles driving around a host vehicle increases or the weather around the host vehicle becomes bad, it may become difficult for an external sensor of the vehicle (LIDAR, laser, etc.) to accurately detect surrounding situation of the host vehicle (obstacles, white lines, etc.). Therefore, autonomous driving may become difficult. That is, there may be a situation where autonomous driving may be difficult. However, in Japanese Patent Publication No. 2013-544695A mentioned above, such a situation cannot be dealt with at all.

On this point, it might appear that the above problem could be solved if requesting termination of autonomous driving, that is, start of manual driving, to the driver when a situation where autonomous driving may be difficult occurs. However, when, for example, autonomous driving is performed over a relatively long time period, if termination of autonomous driving, that is, start of manual driving, is requested to the driver, the driver may be unable to quickly terminate autonomous driving and start manual driving. On this point, this problem may be solved if requesting termination of autonomous driving to the driver before a situation where autonomous driving may be difficult occurs. However, in this case, the driver may feel bothered.

According to one embodiment of the present disclosure, there is provided a control system for an autonomous driving vehicle, comprising: a notification device configured to give notification to a driver; and an electronic control unit comprising: a driving control part configured to perform autonomous driving; a reliability value calculation part configured to calculate an autonomous driving reliability value expressing a degree of reliability of autonomous driving during autonomous driving; and a notification control part configured to control the notification device to notify a request for preparing for manual driving to the driver if the autonomous driving reliability value is equal to of smaller than a predetermined preparation request value.

According to another embodiment of the present disclosure, there is provided a control method of an autonomous driving vehicle comprising: a notification device configured to give notification to a driver; and an electronic control unit, the control method including steps of, using the electronic control unit: performing autonomous driving; calculating an autonomous driving reliability value expressing a degree of reliability of autonomous driving during autonomous driving; and controlling the notification device to notify a request for preparing for manual driving to the driver if the autonomous driving reliability value is equal to or smaller than a predetermined preparation request value.

The present disclosure may be more fully understood from the description of the embodiments according to the present disclosure as set forth below, together with the accompanying drawings.

BRIEF DESCRIPTION OF THE DRAWINGS

FIG. 5 is a view explaining an autonomous driving reliability value.

FIG. 6 is a time chart showing one example of an autonomous driving reliability value in an embodiment according to the present disclosure.

FIG. 7 is a flow chart showing a notification control routine of an embodiment according to the present disclosure.

FIG. 8 is a flow chart showing an operation control routine of an embodiment according to the present disclosure.

DESCRIPTION OF THE EMBODIMENTS

Figure 1:
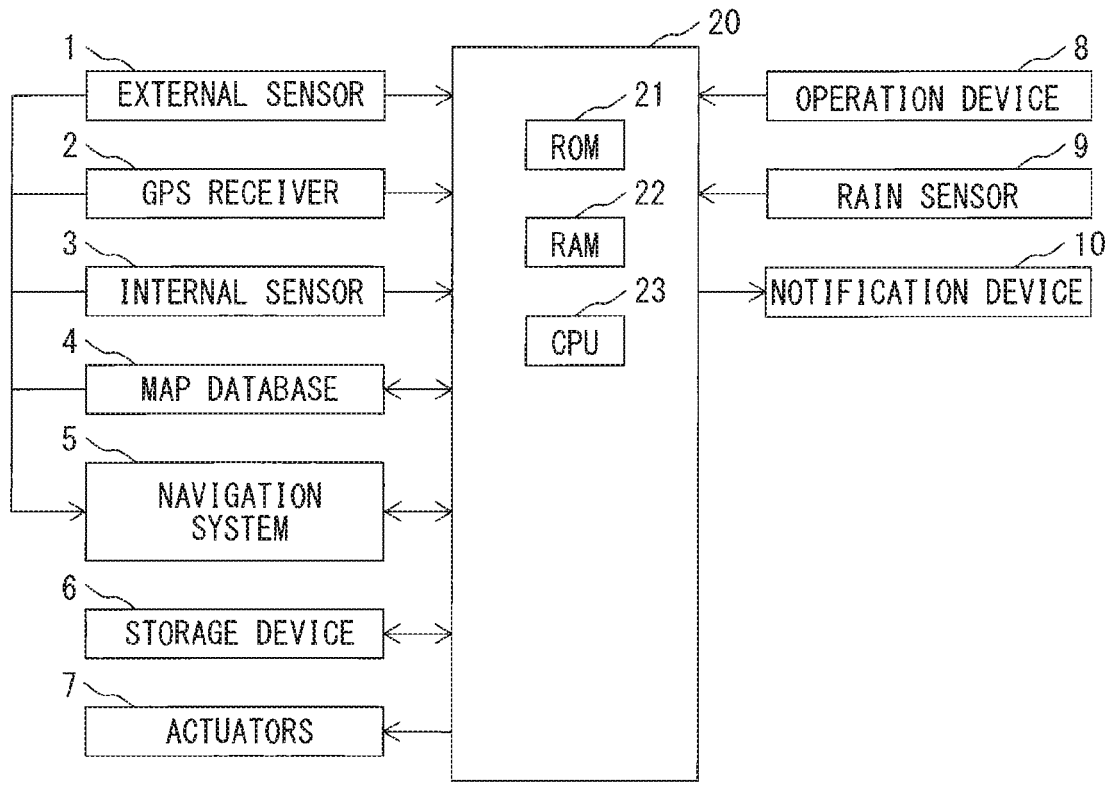
FIG. 1 is a block diagram of a control system for an autonomous driving vehicle of an embodiment according to the present disclosure.

FIG. 1 is a block diagram of a control system for an autonomous driving vehicle of an embodiment according to the present disclosure. Referring to FIG. 1, the control system for an autonomous driving vehicle of the embodiment according to the present disclosure is provided with an external sensor 1, GPS receiver 2, internal sensor 3, map database 4, navigation system 5, storage device 6, various actuators 7, operation device 8, rain sensor 9, notification device 10, and electronic control unit (ECU) 20.

Figure 2:
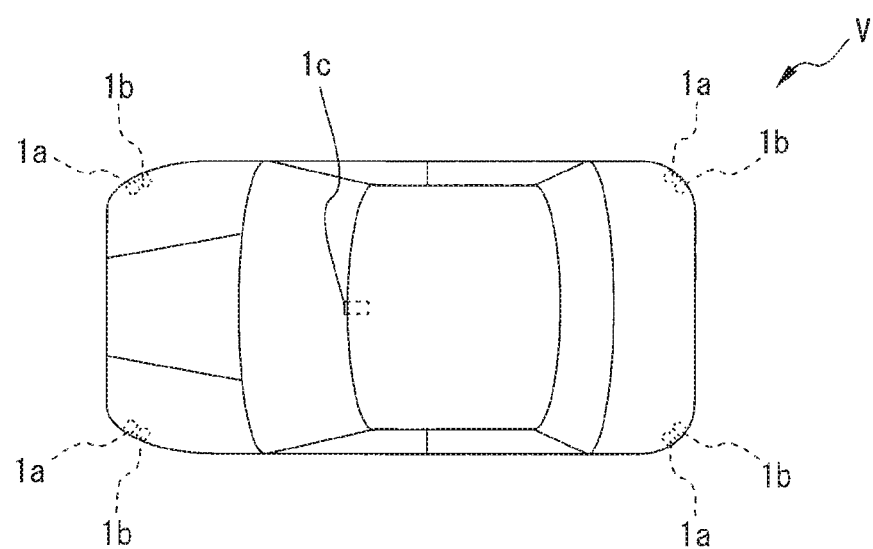
FIG. 2 is a schematic view for explaining an external sensor of an embodiment according to the present disclosure.

The external sensor 1 is configured to detect information at an outside or surroundings of a host vehicle. The external sensor 1 is provided with at least one of a LIDAR (Laser Imaging Detection and Ranging), radar, and camera. In the embodiment according to the present disclosure, as shown in FIG. 2, the external sensor 1 is provided with LIDARs 1a, radars 1b, and camera 1c.

The LIDAR 1a is a device for detecting a road over which the host vehicle is running or outside obstacles, using laser beams. In the example shown in FIG. 2, four LIDARs 1a are respectively attached to bumpers at four corners of the vehicle V. The LIDARs 1a successively fire laser beams toward the surroundings of the host vehicle V and measure distances to the road and obstacles around the road from reflected light to detect the road and obstacles around the host vehicle V in the form of a 3D image. The 3D image of the road and obstacles detected by the LIDARs 1a is transmitted to the electronic control unit 20. On the other hand, the radar 1b is a device for detecting obstacles outside the host vehicle V, using electromagnetic waves. In the example shown in FIG. 2, four radars 1b are attached to the bumpers at the four corners of the vehicle V. The radars 1b emit electromagnetic waves from the radars 1b to the surroundings of the host vehicle V and measures distances to the obstacles in the surroundings of the host vehicle V from reflected waves. The obstacle information detected by the radars 1b is sent to the electronic control unit 20. The camera 1c, in the example shown in FIG. 2, is provided with a front camera provided at an inside of a front glass of the vehicle V. The front camera 1c captures a color or monochrome image of the front of the host vehicle V. The color or monochrome image information obtained by the front camera 1c is transmitted to the electronic control unit 20.

The GPS receiver 2 is configured to receive signals from three or more GPS satellites to thereby detect an absolute position of the host vehicle V (for example, the latitude and longitude of the host vehicle V). The absolute position information of the host vehicle V detected by the GPS receiver 2 is transmitted to the electronic control unit 20.

The internal sensor 3 is configured to detect running condition of the vehicle V. The running condition of the host vehicle V is expressed by at least one of speed, acceleration, and posture of the host vehicle. The internal sensor 3 is provided with one or both of a vehicle speed sensor and IMU (inertial measurement unit). In the embodiment according to the present disclosure, the internal sensor 3 is provided with a vehicle speed sensor and IMU. The vehicle speed sensor detects a speed of the host vehicle V. The IMU is provided with, for example, a three-axis gyro and a 3-direction acceleration sensor, detects a 3D angular speed and acceleration of the host vehicle V, and detects the acceleration and posture of the vehicle V based on these. The running condition information of the vehicle V detected by the internal sensor 3 is transmitted to the electronic control unit 20.

The map database 4 is a database relating to map information. This map database 4 is stored in, for example, an HDD (hard disk drive) mounted in the vehicle. The map information includes, for example, position information of roads, information on road shapes (for example, road width, curved or straight, curvature of curves, positions of intersections, merging points, and branching points etc.), and positions and shapes of buildings.

The navigation system 5 is configured to guide the host vehicle V to a destination input by the driver of the host vehicle V to the navigation system 5. This navigation system 5 calculates a target route up to the destination based on the current position information of the host vehicle V detected by the GPS receiver 2 and the map information of the map database 4. The information of the target route of the host vehicle V is transmitted to the electronic control unit 20.

The storage device 6 stores a road map specially designed for autonomous driving prepared based on the 3D images of obstacles detected by the LIDARs 1a and the results of detection by the LIDARs 1a. The 3D images of the obstacles and road map are constantly or periodically updated.

The actuators 7 are devices for controlling running operations of the host vehicle V in accordance with control signals from the electronic control unit 20. The running operations of the vehicle V include powering, braking, and steering of the vehicle V. The actuators 7 include at least one of a powering actuator, braking actuator, and steering actuator. In the embodiment according to the present disclosure, the actuators 7 include a powering actuator, braking actuator, and steering actuator. The powering actuator controls an output of an engine or electric motor providing drive power of the vehicle V and thereby controls a powering operation of the vehicle V. The braking actuator operates a braking system of the vehicle V and thereby controls a braking operation of the vehicle V. The steering actuator operates a steering system of the vehicle V and thereby controls a steering operation of the vehicle V.

The operation device 8 is configured to be operated by the driver of the vehicle. The operation device 8 is provided with, for example, at least one of a control button, switch, lever, touch panel, voice recognition device (microphone), steering wheel, accelerator pedal, and brake pedal. In the example shown in FIG. 3, the operation device 8 is provided with an operating button 8a. Further, in the example shown in FIG. 3, the operating button 8a is arranged on the steering wheel STR. A signal indicating that the operation device 8 has been operated is sent to the electronic control unit 20.

The rain sensor 9 is configured to detect an amount of rainfall or snowfall around the vehicle V. The information of the amount of rainfall or snowfall detected by the rain sensor 9 is sent to the electronic control unit 20. Note that if the amount of rainfall or snowfall is zero, it is learned that the weather around the vehicle V is clear or cloudy.

Figure 3:
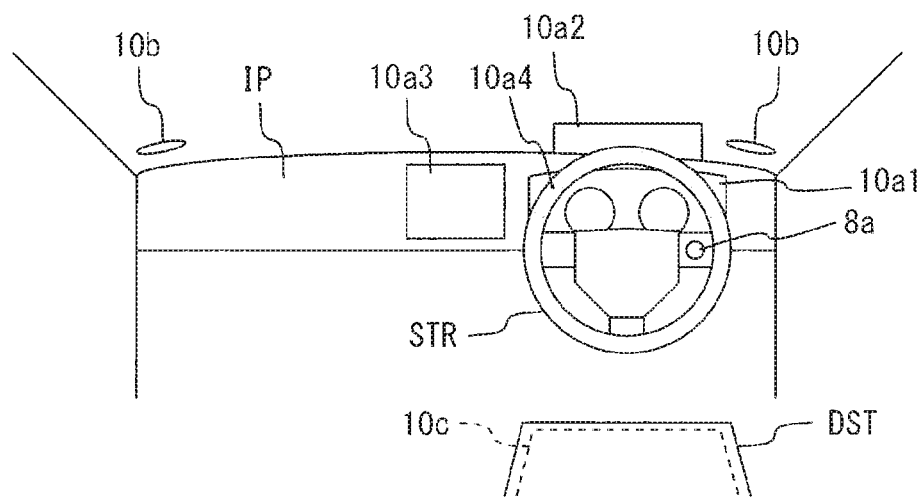
FIG. 3 is a view showing a passenger cabin of an embodiment according to the present disclosure.

The notification device 10 is configured to give notification to the driver. This notification includes at least one of, for example, visual notification, audio notification, and bodily sensation notification. In a case where the notification is visual notification, the notification device 10 is provided with a displaying device which the driver can view. The displaying device is provided with at least one of, for example, a display, lamp, etc. The display includes, for example, a meter display 10a1 provided at an instrument panel IP behind a steering wheel STR, a heads up display 10a2 provided at the instrument panel IP above the meter display 10a1, a center display 10a3 provide at the instrument panel IP at the substantial center in a vehicle width direction, etc., as shown in FIG. 3. The meter display 10a1 displays, for example, a vehicle speed, engine speed, remaining fuel amount, remaining battery power, etc. The center display 10a3 is used for the navigation system 5 to display the target route and display guidance to the destination ("turn left at the next intersection" etc.) In a case where the notification device 10 is provided with a display, the notification device 10 displays text information or image information on the display to give notification to the driver. On the other hand, the lamp includes, for example, an LED (Light Emitting Diode) 10a4 attached to the steering wheel STR, as shown in FIG. 3. In a case where the notification device 10 is provided with a lamp, the notification device 10 turns the lamp on or flashes the lamp to give notification to the driver.

On the other hand, in a case where the notification is an audio notification, the notification device 10 is provided with a speaker, for example. The speaker includes, for example, a pair of speakers 10*b* provided at a top part of the instrument panel IP, as shown in FIG. 3. In a case where the notification device 10 is provided with speakers, the notification device 10 emits at least one of a voice and audio alarm from the speakers to give notification to the driver.

In a case where the notification is a bodily sensation notification, the notification device 10 is provided with, for example, a vibrator giving vibration to the driver. The vibrator includes, for example, a vibrator 10*c* built into a driver's seat DST, as shown in FIG. 3. In a case where the notification device 10 is provided with a vibrator, the notification device 10 makes the vibrator operate to give notification to the driver.

In the embodiment according to the present disclosure, the notification device 10 is provided with at least one of the meter display 10*a*1, heads-up display 10*a*2, center display 10*a*3, steering STR LED 10*a*4, speakers 10*b*, and vibrator 10*c*. The notification device 10 is controlled based on a control signal from the electronic control unit 20.

Figure 4:
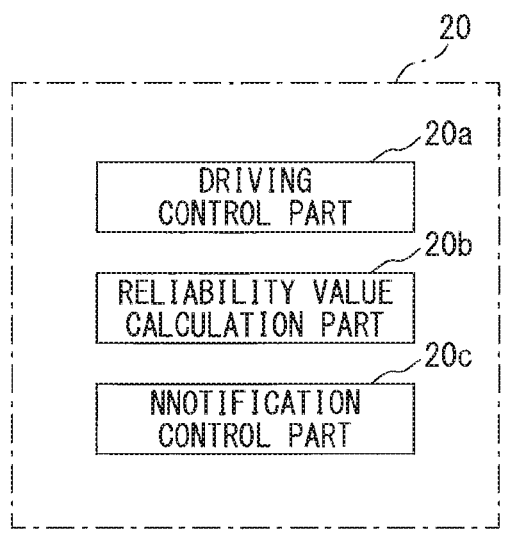
FIG. 4 is a block diagram showing function of an electronic control unit of an embodiment according to the present disclosure.

The electronic control unit 20 is a computer provided with components connected with each other by a bidirectional bus such as a ROM (read only memory) 21, RAM (random access memory) 22, CPU (central processing unit) 23, etc. FIG. 4 is a block diagram showing function of the electronic control unit 20 of the embodiment according to the present disclosure. In the embodiment according to the present disclosure, the electronic control unit 20 is provided with a driving control part 20*a*, a reliability value calculation part 20*b*, and a notification control part 20*c*. The functions of driving control part 20*a*, the reliability value calculation part 20*b*, and the notification control part 20*c* are achieved by the ROM 21, RAM 22, CPU 23, etc. The driving control part 20*a*, the reliability value calculation part 20*b*, and the notification control part 20*c* will be explained later.

Now then, in the embodiment according to the present disclosure, the notification control part 20*c* judges during manual driving if autonomous driving is possible. For example, if the vehicle V is in an area appropriate for autonomous driving and an external state of the vehicle V can be reliably detected by the external sensor 1, it is judged that autonomous driving is possible. As opposed to this, if the vehicle V is in an area inappropriate for autonomous driving or the external state of the vehicle V cannot be reliably detected by the external sensor 1, it is not judged that autonomous driving is possible. If the notification control part 20*c* judges that autonomous driving is possible, the notification control part 20*c* controls the notification device 10 to notify the driver that autonomous driving is possible. Next, if the driver operates the operation device 8, the driving control part 20*a* starts autonomous driving. That is, running operations of the vehicle V, that is, powering, braking, and steering, are controlled by the actuators 7. On the other hand, if the driver operates the operation device 8 during autonomous driving, the driving control part 20*a* terminates autonomous driving and switches the vehicle driving from autonomous driving to manual driving. In this case, the running operations of the vehicle V, that is, the powering, braking, and steering, are performed by the driver.

Note that, in a case where the operation device 8 is provided with the operating button 8*a*, an operation for terminating autonomous driving is a pushing down of the operating button 8*a* by the driver during autonomous driving. Alternatively, in a case where the operation device 8 is provided with the steering wheel, the operation for terminating autonomous driving is an operation of the steering wheel by the driver by a predetermined threshold amount or more during autonomous driving. In a case where the operation device 8 is provided with the accelerator pedal, the operation for terminating autonomous driving is a depression of the accelerator pedal by the driver by a predetermined threshold amount or more during autonomous driving. In a case where the operation device 8 is provided with the brake pedal, the operation for terminating autonomous driving is a depression of the brake pedal by the driver by a predetermined threshold amount or more during autonomous driving.

Further, in the embodiment according to the present disclosure, during autonomous driving, the reliability value calculation part 20*b* repeatedly calculates an autonomous driving reliability value RLB which expresses a degree of reliability of autonomous driving in the form of a numerical value. When the degree of reliability of autonomous driving is low, the autonomous driving reliability value RLB is smaller compared with when the degree of reliability of autonomous driving is high. In the embodiment according to the present disclosure, the reliability value calculation part 20*b* calculates the autonomous driving reliability value RLB based on at least one of density of surrounding vehicles of the vehicle V, precision of localization of the vehicle V, and the weather around the vehicle V.

The density of surrounding vehicles of the vehicle V is an indicator expressing a situation of other vehicles present in the surroundings of the vehicle V. This situation is determined by, for example, at least one of the number of other vehicles present around the vehicle V and a distance between the vehicle V and other vehicles. Specifically, when the number of other vehicles present within a predetermined certain range of distance from the vehicle V is large, the density of surrounding vehicles is higher compared with when the number of the other vehicles is small. Alternatively, when the distance between the vehicle V and other vehicles is short, the density of surrounding vehicles is higher compared to when the distance is long. In this case, if the density of surrounding vehicles is high, compared with if the density of surrounding vehicles is low, the external sensor 1 may be unable to accurately detect the situation around the vehicle V, that is, obstacles, white lines on the road, etc. If the external sensor 1 cannot accurately detect the surrounding situation, it would be difficult to perform autonomous driving with a high reliability. For this reason, as shown in FIG. 5, when the density of surrounding vehicles is high, the autonomous driving reliability value is smaller compared with when the density of surrounding vehicles is low.

On the other hand, in the embodiment according to the present disclosure, the driving control part 20*a* repeatedly performs localization of the vehicle V and repeatedly calculates the precision of localization. This precision of localization is calculated based on, for example, correlation between images obtained by the external sensor 1 such as the camera 1*c* and images stored in the map database 4. If the precision of localization is low, then it is difficult for the external sensor 1 to accurately detect the surrounding situation of the vehicle V. For this reason, as shown in FIG. 5, when the precision of localization is low, the autonomous driving reliability value is smaller compared with when precision of localization is high.

If the weather around the vehicle V is rain, fog, or snow, the external sensor 1 may be unable to accurately detect the surrounding situation of the vehicle V compared with if the weather is clear or cloudy. For this reason, as shown in FIG. 5, when the weather around the vehicle V is rain, fog, or snow, the autonomous driving reliability value is smaller compared with when the weather is clear or cloudy. Further, when an amount of rain, fog, or snow around the vehicle V is large, the autonomous driving reliability value is smaller compared with when the amount is small. Note that the amount of rain or snow is detected by the rain sensor 9 (FIG. 1). The amount of fog is detected by, for example, the LIDAR 1*a*.

For example, the density of surrounding vehicles fluctuates along with the elapse of time. Therefore, the autonomous driving reliability value RLB also fluctuates along with the elapse of time. In some embodiments, if the autonomous driving reliability value RLB becomes excessively small during autonomous driving, autonomous driving becomes difficult, and therefore the autonomous driving is terminated and manual driving is started.

Therefore, in the embodiment according to the present disclosure, the notification control part 20*c* controls the notification device 10 to notify the driver of a request for terminating autonomous driving if the autonomous driving reliability value RLB is equal to or smaller than a predetermined termination request value RLBT during autonomous driving. That is, the driver is requested to operate the operation device 8 to terminate the autonomous driving.

The request for terminating autonomous driving is notified, for example, as in the following manner. That is, in one example, the display such as the meter display 10*a*1, heads up display 10*a*2, or center display 10*a*3 displays the text information such as "please terminate autonomous driving". In another example, the speakers 10*b* are made to emit voice information such as "please terminate autonomous driving". In still another example, the above text information and voice information are given to the driver overlappingly. Providing notification to the driver using a plurality of items of the notification device 10 in this way enables the driver to understand or recognize a notification more surely.

Further, the request for terminating autonomous driving is notified, in one example, from when the autonomous driving reliability value RLB is equal to or smaller than the termination request value RLBT to when the operation device 8 is operated by the driver. In another example, the request for terminating autonomous driving is notified from when the autonomous driving reliability value RLB is equal to or smaller than the termination request value RLBT to when a predetermined constant time period elapses.

If the driver operates the operation device 8 during autonomous driving, as explained above, the autonomous driving is terminated and manual driving is started. On the other hand, in the embodiment according to the present disclosure, if the driver does not operate the operation device 8 despite the request for terminating autonomous driving is notified to the driver, the driving control part 20*a* performs processing for stopping the vehicle V. Specifically, the vehicle V is automatically stopped at, for example, a road shoulder. This enables the vehicle V to be evacuated reliably in a case where, for example, the driver has lost consciousness and therefore cannot operate the operation device 8.

In this regard, as explained at the beginning of this specification, when a request for terminating autonomous driving is notified to the driver, the driver may be unable to quickly terminate autonomous driving and start manual driving.

Therefore, in the embodiment according to the present disclosure, further, when the autonomous driving reliability value RLB is equal to or smaller than a preparation request value RLBP, which is set larger than the termination request value RLBT, the notification control part 20*c* controls the notification device 10 to first notify a request for preparing for manual driving to the driver and then notifies the above-mentioned request for terminating autonomous driving to the driver. That is, the driver is requested to establish conditions for preparing for manual driving.

In the embodiment according to the present disclosure, the conditions for preparing for manual driving include at least a hands-on condition. The hands-on condition includes, for example, a condition of the driver placing his or her hand(s) on the steering wheel STR, a condition of the driver gripping the steering wheel STR, etc. In another embodiment (not shown), the conditions for preparing for manual driving include, in addition to the hands-on condition, a condition of the driver placing his or her foot on the brake pedal, a condition in which the gaze of the driver is directed to the front of the vehicle, etc.

A request for preparing for manual driving is notified for example in the same way as a request for terminating autonomous driving. That is, in one example, the display such as the meter display 10*a*1, heads up display 10*a*2, or center display 10*a*3 displays the text information such as "please prepare for manual driving". In another example, the speakers 10*b* are made to emit voice information "please prepare for manual driving". In still another example, the above text information and voice information are given to the driver overlappingly.

Further, the request for terminating manual driving is notified, as one example, from when the autonomous driving reliability value RLB is equal to or smaller than a preparation request value RLBP to when the autonomous driving reliability value RLB is equal to or smaller than the termination request value RLBT or is larger than the preparation request value RLBP. In another example, the request for preparing for manual driving is notified from when the autonomous driving reliability value RLB is equal to or smaller than the preparation request value RLBP to when a predetermined certain time elapses. In still another example, the request for preparing for manual driving is notified from when the autonomous driving reliability value RLB is equal to or smaller than the preparation request value RLBP to when the driver establishes conditions preparing for manual driving. In this case, a sensor is provided detecting that the driver is in a state prepared for manual driving. This sensor includes, for example, a steering touch sensor detecting that the driver is in a hands-on condition.

FIG. 6 shows an example of a change of the autonomous driving reliability value RLB along with time. In the example shown in FIG. 6, when the autonomous driving reliability value RLB becomes equal to or smaller than the preparation request value RLBP at the time t1, the request for preparing for manual driving is notified. Next, when the autonomous driving reliability value RLB becomes larger than the preparation request value RLBP at the time t2, the notification of the request for preparing for manual driving is stopped. Next, when the autonomous driving reliability value RLB again becomes equal to or smaller than the preparation request value RLBP at the time t3, the request for preparing for manual driving is again notified. Next, when the autonomous driving reliability value RLB becomes equal to or smaller than the termination request value RLBT at the time t4, the request for terminating autonomous driving is notified.

In this way, in the embodiment according to the present disclosure, the request for preparing for manual driving is notified to the driver if the autonomous driving reliability value RLB becomes smaller accidentally. If the autonomous driving reliability value RLB becomes further smaller, the request for terminating autonomous driving is notified to the driver. If the driver is in a condition prepared for manual driving when the request terminating autonomous driving is notified, the driver can quickly terminate the autonomous driving and start the manual driving. Therefore, when a situation where autonomous driving is difficult occurs accidentally, the driver can reliably and quickly deal with that situation.

Further, the request for preparing for manual driving does not request for terminating autonomous driving to the driver. That is, the driver can establish conditions for preparing for manual driving while continuing autonomous driving. Therefore, the driver is limited from feeling bothered.

In this way, the request for preparing for manual driving requests the driver to establish conditions for preparing for manual driving while the driver is continuing with autonomous driving. Therefore, the request for preparing for manual driving completely differs in nature from the request for terminating autonomous driving which requests for terminating autonomous driving.

In the embodiment according to the present disclosure, further, if the autonomous driving reliability value RLB becomes larger than the preparation request value RLBP when the request for preparing for manual driving is being notified, the notification of the request for preparing for manual driving is stopped. Therefore, in this case as well, the driver is limited from feeling bothered.

Note that, while not shown in FIG. 6, in the embodiment according to the present disclosure, if the autonomous driving reliability value RLB becomes larger than the termination request value RLBT but not more than the preparation request value RLBP when autonomous driving is performed while the request for terminating autonomous driving is being notified, the notification control part 20c stops notification of the request for terminating autonomous driving and notifies the request for preparing for manual driving.

FIG. 7 shows a routine for performing the above-mentioned notification control of the embodiment according to the present disclosure. This routine is performed by interruption every predetermined set time. Referring to FIG. 7, at step 100, it is judged if the vehicle V is in a process of autonomous driving. If the vehicle V is not in a process of autonomous driving, that is, if it is in a process of manual driving, the processing cycle is ended. If the vehicle V is in a process of autonomous driving, next the routine proceeds to step 101 where the autonomous driving reliability value RLB is calculated. At the next step 102, it is judged if the autonomous driving reliability value RLB is equal to or smaller than the preparation request value RLBP. If RLB>RLBP, the processing cycle is ended. As opposed to this, if RLB≤RLBP, next the routine proceeds to step 103 where it is judged if the autonomous driving reliability value RLB is equal to or smaller than the termination request value RLBT. If RLB>RLBT, that is, if RLBT<RLB≤RLBP, next the routine proceeds to step 104 where the request for preparing for manual driving is notified to the driver. In this case, the notification of the request for terminating autonomous driving is stopped. As opposed to this, if RLB≤RLBT, next the routine proceeds to step 105 where the request for terminating autonomous driving is notified to the driver. In this case, notification of the request for preparing for manual driving is stopped.

FIG. 8 shows a routine for performing the above-mentioned driving control of the embodiment according to the present disclosure. This routine is performed by interruption every predetermined set time period. Referring to FIG. 8, at step 200, it is judged if autonomous driving is in process. If autonomous driving is not in process, that is, manual driving is in process, next the routine proceeds to step 201 where it is judged if autonomous driving is possible. If autonomous driving is not possible, the processing cycle is ended. If autonomous driving is possible, the routine next proceeds to step 202 where it is judged if the driver has operated the operation device 8 to perform autonomous driving. If the operation device 8 has not been operated, the processing cycle is ended. If the operation device 8 has been operated, next the routine proceeds to step 203 where autonomous driving is performed.

On the other hand, if autonomous driving is in process, the routine proceeds from step 200 to step 204 where it is judged if the driver has operated the operation device 8 to terminate autonomous driving. If the operation device 8 has been operated, next the routine proceeds to step 205 where the autonomous driving is terminated. That is, manual driving is started. As opposed to this, if the operation device 8 has not been operated, the routine proceeds from step 204 to step 206 where it is judged if the request for terminating autonomous driving has been notified to the driver. If no request for terminating autonomous driving is notified, the processing cycle is ended. If the request for terminating autonomous driving is notified, that is, if the driver has not operated the operation device 8 despite the request for terminating autonomous driving having been notified, the routine next proceeds to step 207 where processing for stopping the vehicle is performed. Note that, in the embodiment according to the present disclosure, if the driver does not operate the operation device 8 despite a certain time period having elapsed from when the request for terminating autonomous driving was notified, processing for stopping the vehicle is performed.

Figure 9:
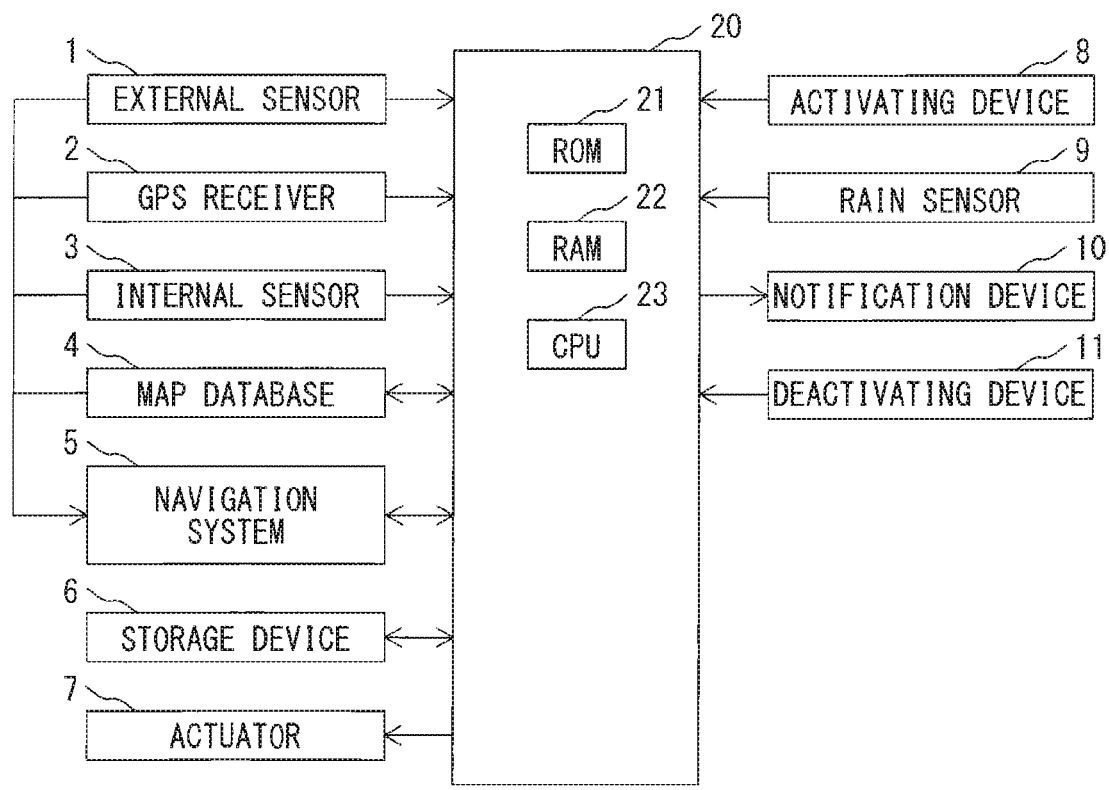
FIG. 9 is a block diagram of a control system for an autonomous driving vehicle of another embodiment according to the present disclosure.

FIG. 9 shows another embodiment according to the present disclosure. In the embodiment shown in FIG. 9, the control system for an autonomous driving vehicle further comprises a deactivating device 11 configured to be operated by the driver of the vehicle. The deactivating device 11 is provided with, for example, at least one of an operation button, switch, lever, touch panel, and voice recognition device (microphone). A signal indicating that the deactivating device 11 has been operated is sent to the electronic control unit 20. The electronic control unit 20 in the embodiment shown in FIG. 11 is also provided with a driving control part 20a, a reliability value calculation part 20b, and a notification control part 20c, similar to the electronic control unit 20 in the embodiment shown in FIG. 1.

In the embodiment shown in FIG. 9, if the deactivating device 11 is operated by the driver, the notification control part 20c deactivates the request for preparing for manual driving. Whether the driver can quickly start manual driving when manual driving should be started depends on the skill and proficiency of the driver. Therefore, if a request for preparing for manual driving is notified to a driver who can quickly start manual driving, the driver may feel bothered. In the embodiment shown in FIG. 9, in such a case, the driver can deactivate notification of a request for preparing for manual driving and, therefore, it is possible to limit the driver from feeling bothered.

Note that, in the embodiment shown in FIG. 9, when the notification of a request for preparing for manual driving is deactivated, if the deactivating device 11 is operated again by the drive, notification of a request for preparing for manual driving is again activated. Therefore, it is possible to switch between activation and deactivation of notification of a request for preparing for manual driving depending on, for example, drivers.

Figure 10:
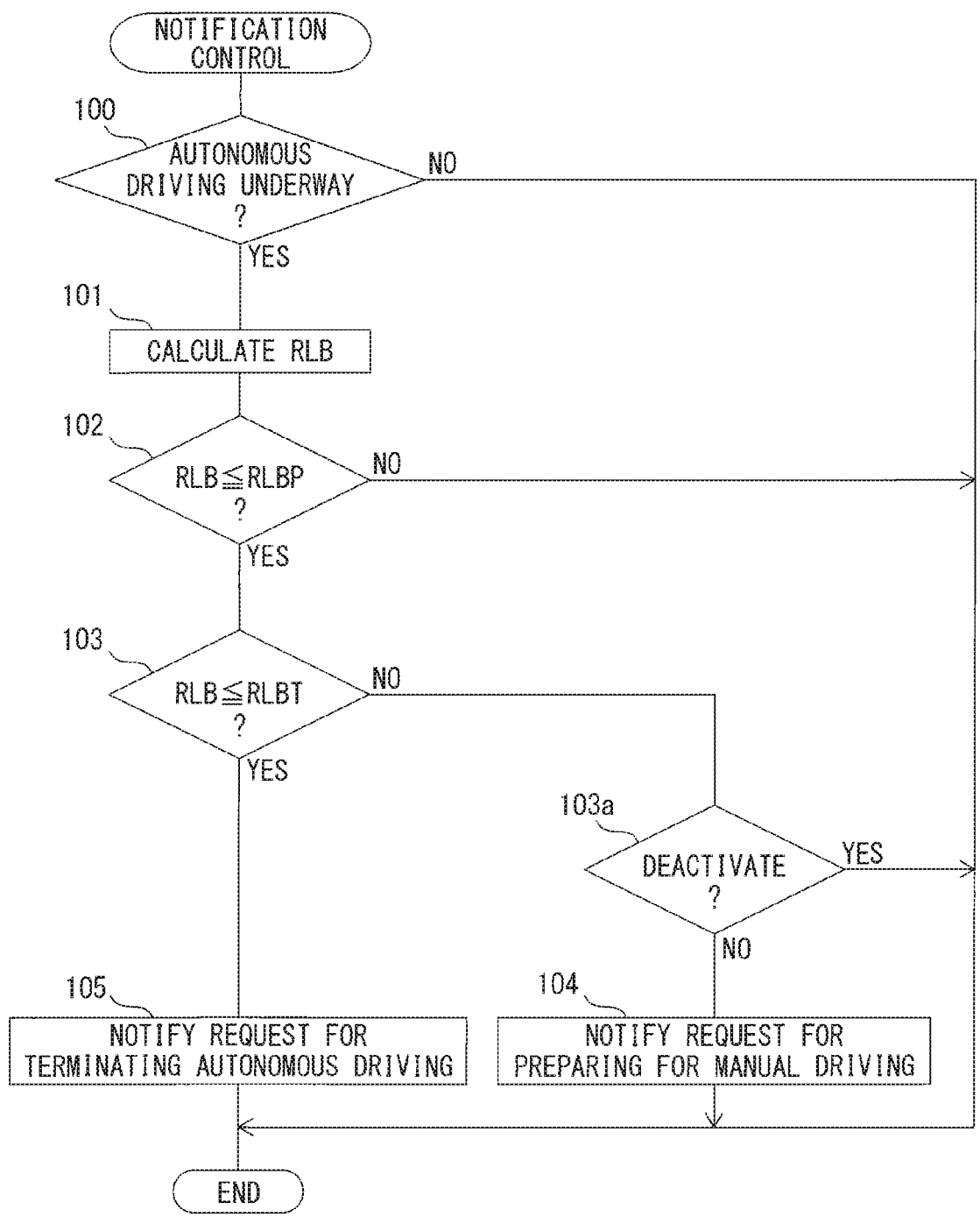
FIG. 10 is a flow chart showing a notification control routine of another embodiment according to the present disclosure.

FIG. 10 shows a routine for performing notification control of the embodiment shown in FIG. 9. Below, points of difference between the routine shown in FIG. 10 and the routine shown in FIG. 7 will be explained. If RLB>RLBT, that is, if RLBT<RLB≤RLBP, at step 103, next the routine proceeds to step 103a where it is judged if the notification of the request for preparing for manual driving should be deactivated. If the notification of the request for preparing for manual driving should not be deactivated, next the routine proceeds to step 104. As opposed to this, if the notification of the request for preparing for manual driving should be deactivated, the processing cycle is ended.

Note that, in the embodiment shown in FIG. 9, the operation device 8 and the deactivating device 11 are mutually different devices. However, so long as it is possible to discriminate between when the operation by the driver is an operation for deactivating notification of a request for preparing for manual driving or an operation for terminating or starting autonomous driving, the operation device 8 and the deactivating device 11 may be the same devices as each other.

It is possible to limit the driver from feeling bothered while enabling the driver to more quickly start manual driving.

While the present disclosure has been described by reference to specific embodiments chosen for purposes of illustration, it should be apparent that numerous modifications could be made thereto, by those skilled in the art, without departing from the basic concept and scope of the present disclosure.

What is claimed is:

1. A control system for an autonomous driving vehicle, comprising:
 a notification device configured to give notification to a driver;
 an operation device configured to be operated by the driver; and
 an electronic control unit comprising:
  a driving control part configured to perform autonomous driving, the driving control part being configured to terminate autonomous driving and switch vehicle operation to manual driving when the driver operates the operation device during autonomous driving;
  a reliability value calculation part configured to calculate an autonomous driving reliability value expressing a degree of reliability of autonomous driving during autonomous driving; and
  a notification control part configured to control the notification device to notify a request for preparing for manual driving to the driver when the autonomous driving reliability value is equal to or smaller than a predetermined preparation request value during autonomous driving, the request for preparing for manual driving being one which requests the driver to establish conditions for preparing for manual driving while the driver is continuing with autonomous driving, and
  to control the notification device to stop notification of the request for preparing for manual driving and notify a request for terminating autonomous driving to the driver when the autonomous driving reliability value is equal to or smaller than a termination request value which is set smaller than the preparation request value during autonomous driving, the request for terminating autonomous driving being one which requests the driver to operate the operation device to terminate autonomous driving.

2. The control system for an autonomous driving vehicle according to claim 1, wherein the notification control part is configured to control the notification device to stop notification of the request for preparing for manual driving when the autonomous driving reliability value becomes larger than the preparation request value during notification of the request for preparing for manual driving.

3. The control system for an autonomous driving vehicle according to claim 1, wherein the reliability value calculation part is configured to calculate the autonomous driving reliability value based on density of surrounding vehicles expressing a degree of density of other vehicles around the vehicle.

4. The control system for an autonomous driving vehicle according to claim 1, wherein the reliability value calculation part is configured to calculate the autonomous driving reliability value based on precision of localization of the vehicle.

5. The control system for an autonomous driving vehicle according to claim 1, wherein the reliability value calculation part is configured to calculate the autonomous driving reliability value based on weather around the vehicle.

6. A control method of an autonomous driving vehicle comprising:
 a notification device configured to give notification to a driver;
 an operation device configured to be operated by the driver; and
 an electronic control unit,
 the control method including steps of, using the electronic control unit:
 performing autonomous driving;
 terminating autonomous driving and switching vehicle operation to manual driving when the driver operates the operation device during autonomous driving;
 calculating an autonomous driving reliability value expressing a degree of reliability of autonomous driving during autonomous driving;
 controlling the notification device to notify a request for preparing for manual driving to the driver when the autonomous driving reliability value is equal to or smaller than a predetermined preparation request value during autonomous driving, the request for preparing for manual driving being one which requests the driver to establish conditions for preparing for manual driving while the driver is continuing with autonomous driving; and
 controlling the notification device to stop notification of the request for preparing for manual driving and notify a request for terminating autonomous driving to the driver when the autonomous driving reliability value is equal to or smaller than a termination request value which is set smaller than the preparation request value during autonomous driving, the request for terminating autonomous driving being one which requests the driver to operate the operation device to terminate autonomous driving.

7. The control method of an autonomous driving vehicle according to claim 6, further including the steps of, using the electronic control unit, controlling the notification device to stop notification of the request for preparing for manual driving when the autonomous driving reliability value becomes larger than the preparation request value during notification of the request for preparing for manual driving.

8. The control method of an autonomous driving vehicle according to claim 6, further including the steps of, using the electronic control unit, calculating the autonomous driving reliability value based on density of surrounding vehicles expressing a degree of density of other vehicles around the vehicle.

9. The control method of an autonomous driving vehicle according to claim 6, further including the steps of, using the electronic control unit, calculating the autonomous driving reliability value based on precision of localization of the vehicle.

10. The control method of an autonomous driving vehicle according to claim 6, further including the steps of, using the electronic control unit, calculating the autonomous driving reliability value based on weather around the vehicle.

\* \* \* \* \*